United States Patent
Poo (10) Patent No.: US 7,036,439 B2
(45) Date of Patent: May 2, 2006

(54) TABLE TOP AND PROCESS OF MAKING THE SAME

(76) Inventor: Hao-Wei Poo, 14F, No. 28, Tung-Hsing Rd., Taipei City (TW)

( * ) Notice: Subject to any disclaimer, the term of this patent is extended or adjusted under 35 U.S.C. 154(b) by 346 days.

(21) Appl. No.: 10/694,354

(22) Filed: Oct. 28, 2003

(65) Prior Publication Data

US 2004/0200392 A1    Oct. 14, 2004

Related U.S. Application Data

(63) Continuation-in-part of application No. 10/411,197, filed on Apr. 11, 2003.

(51) Int. Cl.
   *A47B 13/00* (2006.01)

(52) U.S. Cl. ............................ 108/161

(58) Field of Classification Search ............... 108/161; 264/298, 246, 279.1, 241, 240; 428/38, 313.7, 428/178, 128, 317.1; 156/245, 242
See application file for complete search history.

(56) References Cited

U.S. PATENT DOCUMENTS

| | | | | |
|---|---|---|---|---|
| 2,644,733 A | * | 7/1953 | Castle | 108/90 |
| 3,062,604 A | * | 11/1962 | Hodgen | 108/161 |
| 3,150,032 A | * | 9/1964 | Rubenstein | 108/161 |
| 3,174,893 A | * | 3/1965 | Church et al. | 108/161 |
| 3,212,952 A | * | 10/1965 | Turner | 108/161 |
| 4,761,931 A | * | 8/1988 | Schrunk | 108/161 |
| 6,659,023 B1 | * | 12/2003 | Saltzman et al. | 108/161 |
| 6,837,171 B1 | * | 1/2005 | Clark et al. | 108/161 |

* cited by examiner

*Primary Examiner*—José V. Chen
(74) *Attorney, Agent, or Firm*—Lowe, Hauptman & Berner, LLP (57) ABSTRACT

A process for making a table top includes the steps of (a) mounting a ring-shaped outer mold on a flat surface, (b) mounting decorative members arranged in a layer on the flat surface and within the outer mold, the decorative members being spaced apart from each other to form gaps theream ong, (c) filling the gaps with a curable binder, and providing a layer of the binder on the decorative members, (d) mounting at least one fastening member on the binder, the fastening member including a head portion embedded in the binder, and a fastening portion extending out of the binder from the head portion, and (e) adhering a rigid support plate to the binder, the rigid support plate including at least one hole corresponding to the fastening portion of the fastening member for passage of the fastening portion of the fastening member therethrough.

20 Claims, 9 Drawing Sheets

TABLE TOP AND PROCESS OF MAKING THE SAME

CROSS-REFERENCE TO RELATED APPLICATION

This application is a continuation-in-part of U.S. patent application Ser. No. 10/411,197, filed by the applicant on Apr. 11, 2003.

BACKGROUND OF THE INVENTION

1. Field of the Invention

The invention relates to a table top, more particularly to a table top with at least one pre-mounted fastening member and to a process of making the same.

2. Description of the Related Art

U.S. patent application Ser. No. 10/411,197 discloses a table top with a multi-layered structure, which includes a plurality of first decorative members, a mesh layer, a cured binder, a support plate, and a plurality of second decorative members. The first decorative members cooperate with the second decorative members to provide a stereo visual effect. The multi-layered structure reinforces the connection between each layer and the overall structural strength of the table top.

Figure 1:
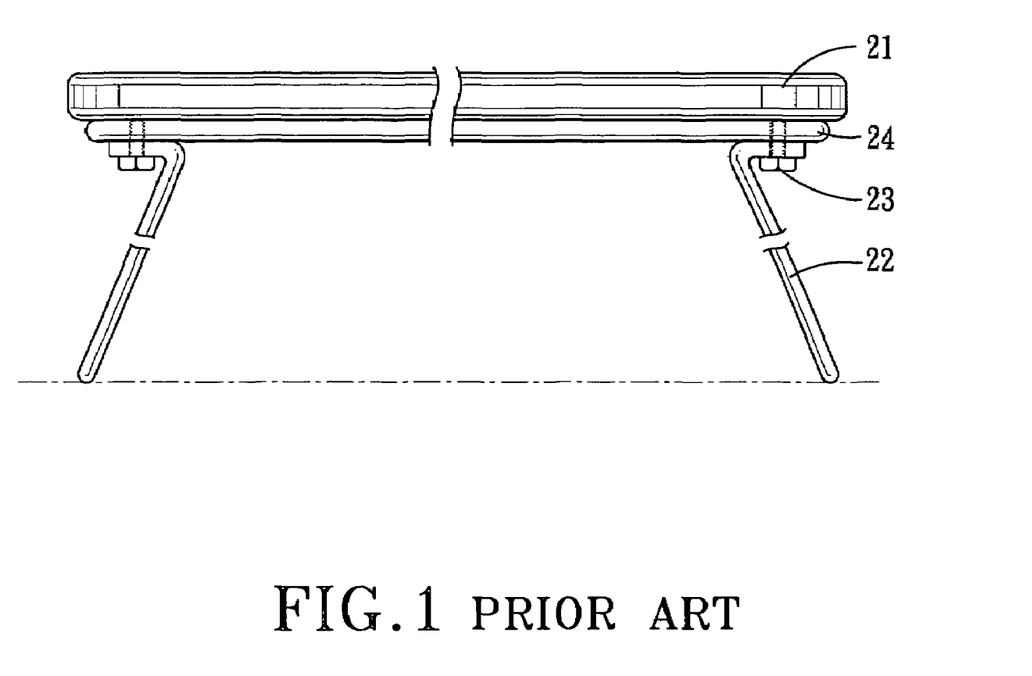
FIG. 1 is a fragmentary schematic view of a conventional table.

Referring to FIG. 1, a conventional table is shown to include a table top 21 and a plurality of table legs 22. An annular member 24 is provided on top of the table legs 22 and is fastened to the table legs 22 with the use of screw members 23. The table top 21 is then adhered to the annular member 24 so as to complete the conventional table.

It is noted that the aforesaid process for constructing the conventional table is costly and time-consuming. Therefore, it is desired to overcome the shortcomings of the prior art.

SUMMARY OF THE INVENTION

The main object of the present invention is to provide a table top with at least one pre-mounted fastening member for fastening directly to a table leg and the process of making the same.

Another object of the present invention is to provide a table top with at least one fastening member mounted integrally therewithin and the process of making the same.

According to one aspect of this invention, a process for making a table top comprises the steps of:

(a) mounting a ring-shaped outer mold on a flat surface;

(b) mounting a plurality of decorative members which are arranged in a layer on the flat surface and within the outer mold, the decorative members being spaced apart from each other to form gaps thereamong;

(c) filling the gaps with a curable binder, and providing a layer of the binder on the decorative members;

(d) mounting at least one fastening member on the binder, the fastening member including a head portion embedded in the binder, and a fastening portion extending out of the binder from the head portion, and having a cross section smaller than that of the head portion; and (e) adhering a rigid support plate to the binder, the rigid support plate including at least one hole corresponding to the fastening portion of the fastening member for passage of the fastening portion of the fastening member therethrough.

According to another aspect of this invention, a table top includes a top layer, a cured binder, at least one fastening member, and a rigid support plate. The top layer has a plurality of decorative members which are spaced apart from each other to form gaps thereamong. The cured binder fills the gaps and forms a layer that covers a bottom surface of the top layer. The fastening member includes a head portion embedded in the cured binder, and a fastening portion extending out of the cured binder from the head portion, and having a cross section smaller than that of the head portion. The rigid support plate is adhered to the cured binder, and includes at least one hole corresponding to the fastening portion of the fastening member for passage of the fastening portion of the fastening member therethrough.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 2:
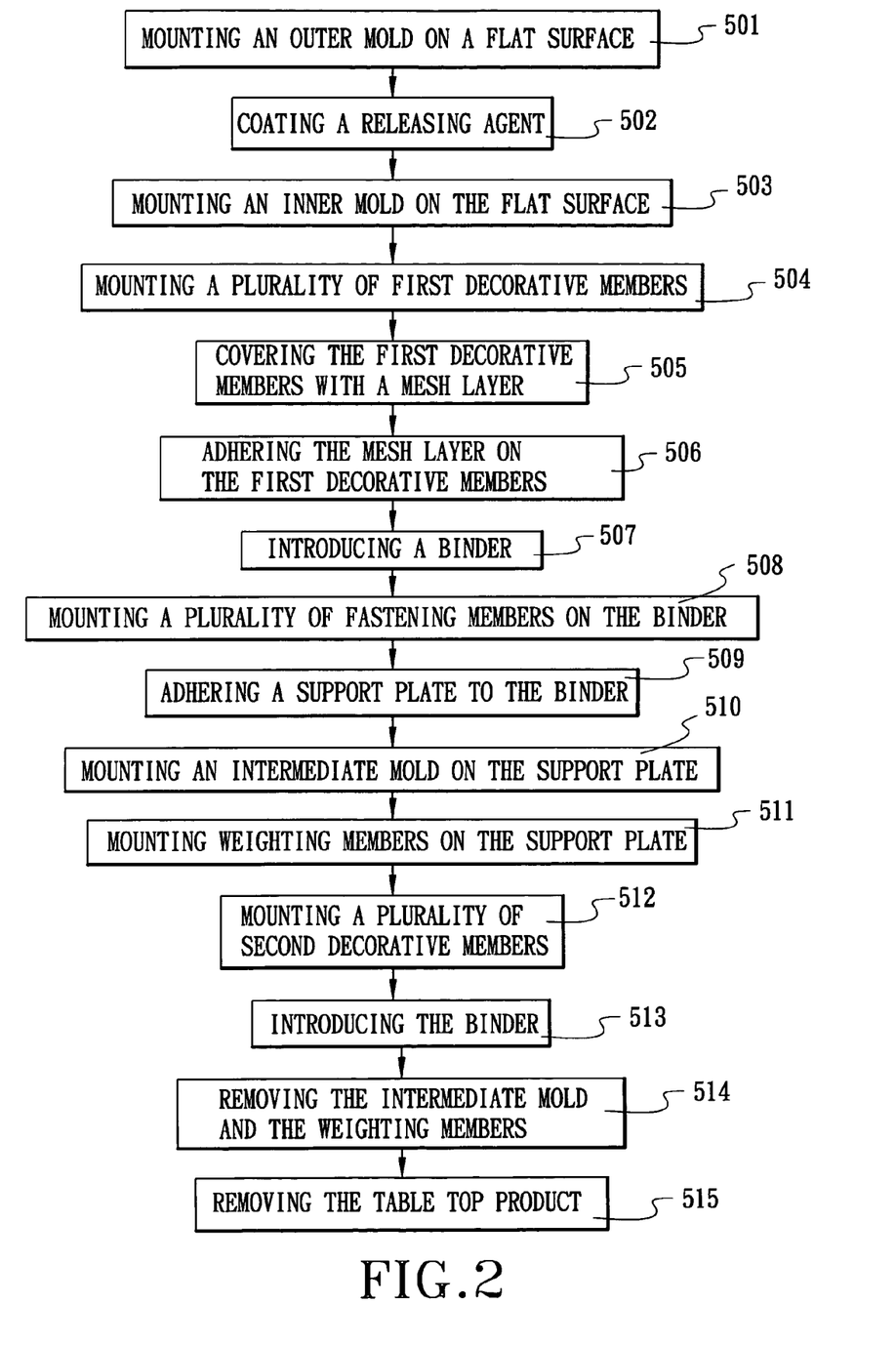
FIG. 2 is a flow chart illustrating the preferred embodiment of the process for making a table top according to the present invention.

The preferred embodiment of the process for making a table top 3 (see FIGS. 13, 14, and 15) according to the present invention comprises the steps shown in FIG. 2.

Figure 3:
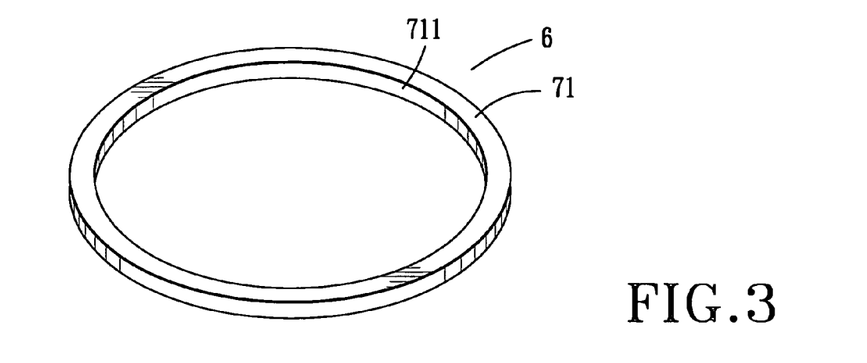
FIG. 3 is a perspective view of an outer mold used in the preferred embodiment.

Referring to FIG. 3, in combination with FIG. 2, in step 501, a ring-shaped outer mold 71 is mounted on a flat surface 6. The flat surface 6 in this embodiment is a floor. However, the flat surface 6 can also be a glass surface, a working platform, or other suitable flat surfaces. The outer mold 71 is mainly formed from a resin, and has an inner periphery 711 forming a height from the flat surface 6. However, the outer mold 71 is not limited to the shape and material of the disclosed embodiment. It may be square, rectangle, oblong, or any other suitable geometric shape, and may be made from metal, such as steel or iron, wood, or other materials. In addition, the flat surface 6 is also not limited to a completely flat surface. The surface may be suitably curved so that a table top 3 (see FIGS. 13, 14, and 15) produced by the process can have a curved outer appearance.

In step 502, the inner periphery 711 of the outer mold 71 and the flat surface 6 within the inner periphery 711 are coated with a wax layer (not shown) or other suitable releasing agent so that when the table top 3 is finally formed, it can be easily separated from the outer mold 71 and the flat surface 6.

Figure 4:
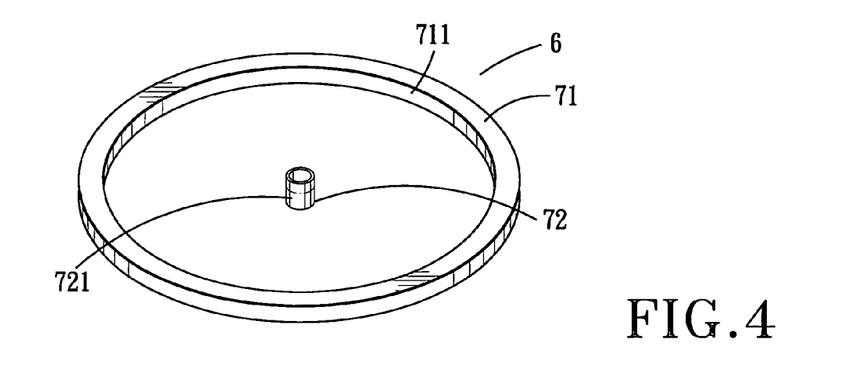
FIG. 4 is a perspective view illustrating an inner mold placed at a center of the outer mold.

In step 503, with further reference to FIG. 4, a hollow inner mold 72 made of resin is mounted on the flat surface 6 at the center of the outer mold 71, and is used as a reference for the succeeding processing steps. The outer periphery 721 of the inner mold 72 is similarly coated with a wax layer or other suitable releasing agent. The material and shape of the inner mold 72 are preferably similar to those of the outer mold 71, but the position of the inner mold 72 can be altered according to the shape of the outer mold 71. When the table top 3 is finally formed, the inner mold 72 will be removed to leave a circular hole in a central part of a top layer of the table top 3 for removable insertion of a post of an umbrella body (not shown) therethrough. As such, the table top 3 can be disposed outdoors with the umbrella body serving as a parasol. However, the inner mold 72 is optional, and can be omitted in other alternative preferred embodiments.

Figure 5:
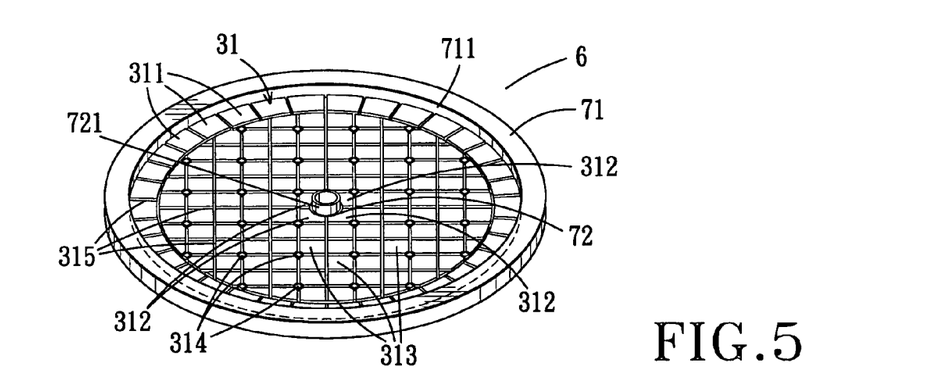
FIG. 5 is a perspective view illustrating first decorative members placed within the outer mold.

In step 504, with further reference to FIG. 5, a plurality of first decorative members 31 are arranged in a layer on the flat surface 6 between the outer and inner molds 71, 72 to form the top layer of the table top 3. The appearance of the table top 3 can be enhanced by varying the materials, colors, and shapes of the first decorative members 31. The first decorative members 31 include tiles 311 which are circumferentially mounted proximate to the inner periphery 711 of the outer mold 71, tiles 312 which are disposed around the outer periphery 721 of the inner mold 72, tiles 313 which are mounted between the tiles 311 and 312, and diamond-shaped tiles 314, each of which is provided among four tiles 313. The tiles 311, 312, 313, 314 are spaced apart from each other to form gaps 315 thereamong, and are cut appropriately prior to their mounting on the flat surface 6. In this embodiment, while the first decorative members 31 are tiles 311, 312, 313, 314, they may be made of marble, glass, mosaic, metal, plastic, wood, or other natural or synthetic materials, and can have different shapes and colors.

Figure 6:
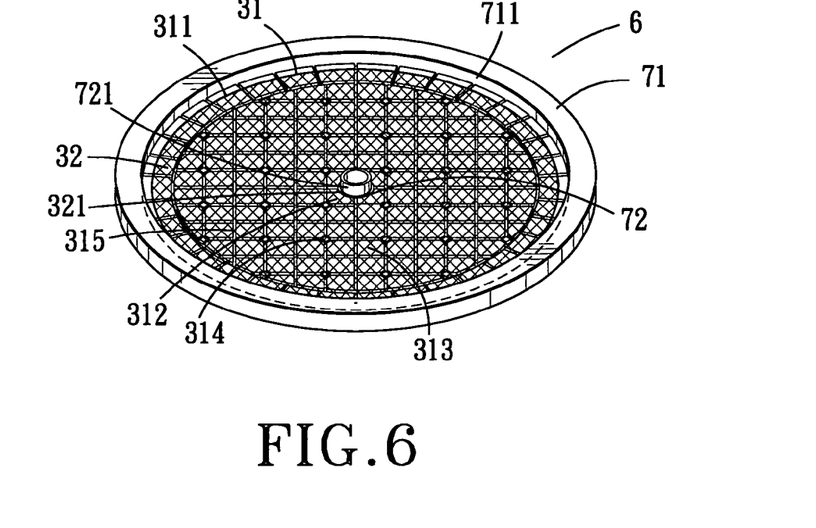
FIG. 6 is a perspective view illustrating a mesh layer placed on the first decorative members.

In step 505, with further reference to FIG. 6, a mesh layer 32 is mounted on surfaces of the tiles 311, 312, 313, 314. The mesh layer 32 is circular, and has a dimension slightly smaller than an inner diameter of the outer mold 71, and a central opening 321 for extension of the inner mold 72 therethrough. In this embodiment, the mesh layer 32 has a mesh opening of 5 mm×6 mm, and is a rectangular mesh made of nylon thread. However, the nylon thread can be replaced with other natural or synthetic fiber material. Dimension and shape of the mesh opening can be suitably altered.

In step 506, the mesh layer 32 is adhered fixedly on the surfaces of the first decorative members 31 by means of an adhesive (not shown) so as to facilitate the succeeding processing steps. In this embodiment, the adhesive includes an unsaturated polyester resin and a suitable amount of curing agent, and requires a curing time of about ten minutes. Other suitable adhesive or curing agents can be used as well.

Figure 7:
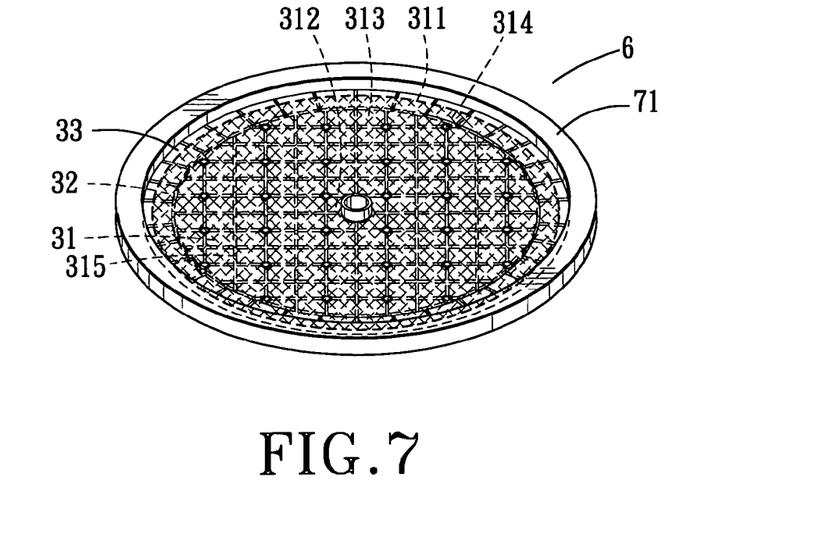
FIG. 7 is a perspective view illustrating a binder layer introduced into the outer mold.

In step 507, with further reference to FIG. 7, after the above adhesive has cured, a binder 33 is introduced to fill the gaps 315 among the tiles 311, 312, 313 and 314 and to cover a surface of the mesh layer 32. Thereafter, the surface of the binder 33 is leveled to form a binder layer. In this embodiment, the binder 33 has the same material as the aforementioned adhesive, which includes an unsaturated polyester resin and a suitable amount of curing agent. As such, costs can be minimized.

Figure 8:
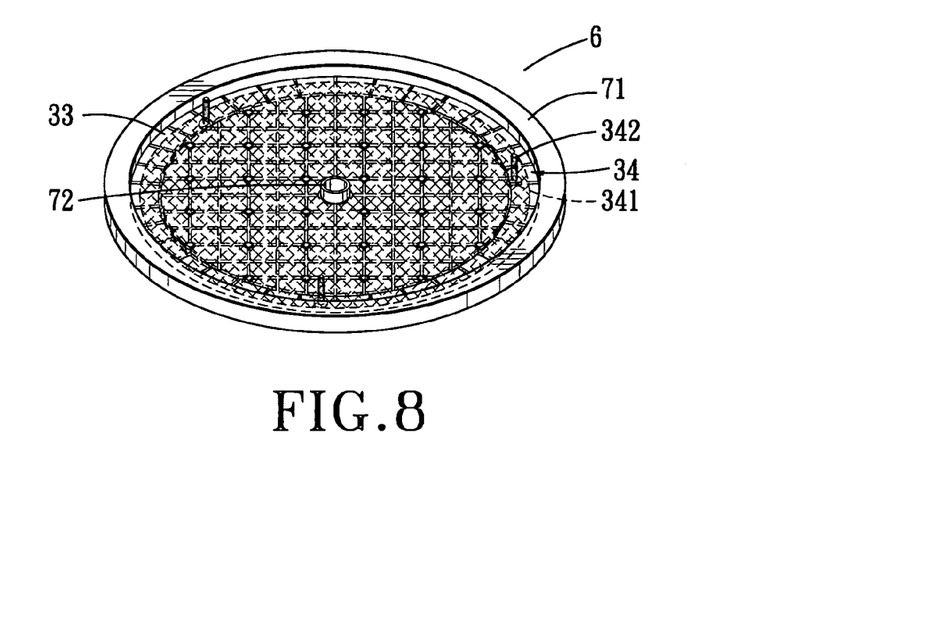
FIG. 8 is a perspective view illustrating a plurality of fastening members mounted on the binder layer.
Figure 9:
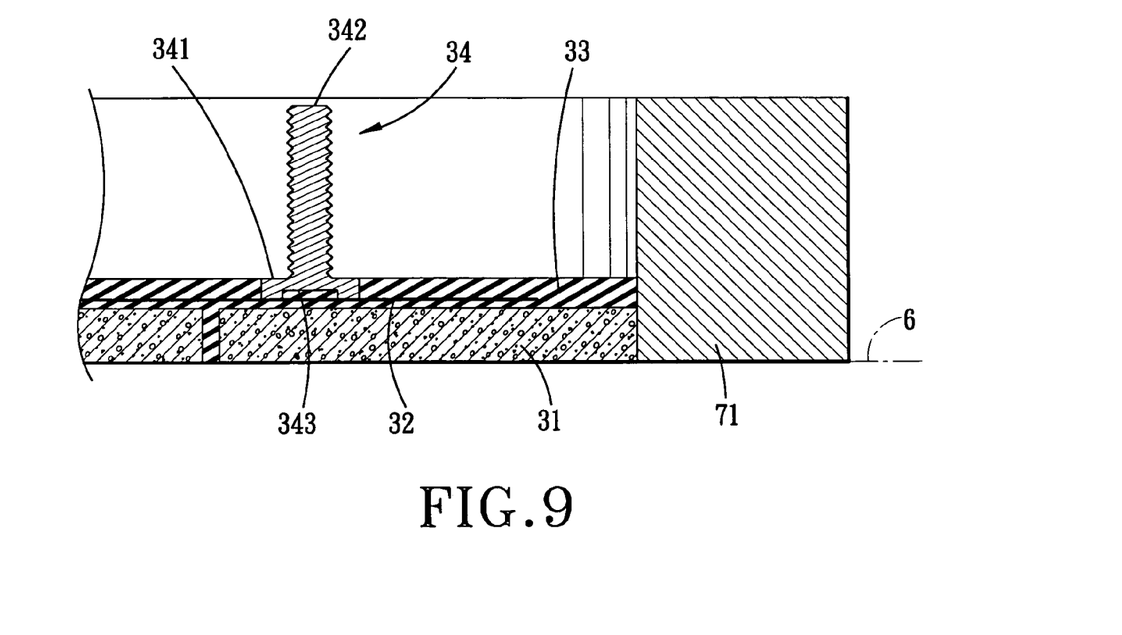
FIG. 9 is a fragmentary schematic sectional view of FIG. 8.
Figure 10:
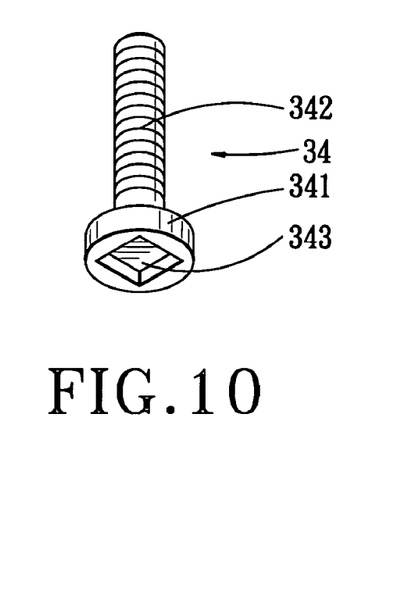
FIG. 10 is a perspective view of an example of the fastening member useful in the preferred embodiment.

In step 508, with further reference to FIGS. 8, 9, and 10, a plurality of fastening members 34 are mounted on the mesh layer 32 before curing of the binder 33 is completed. In the preferred embodiment, the fastening members 34 are bolts which are spaced apart from each other at an angular distance of about 120°. Each fastening member 34 includes a head portion 341 embedded in the binder 33, and a fastening portion 342 extending out of the binder 33 from the head portion 341. The fastening portion 342 of each of the fastening members 34 has a cross section smaller than that of the head portion 341. The fastening portion 342 of each of the fastening members is formed as a post having an outer thread. The head portion 341 of each of the fastening members 34 is provided with a recess 343 for receiving the binder 33 so as to enhance the positioning effect of the fastening members 34 in the binder 33. Furthermore, the recess 343 in the head portion 341 of each of the fastening members 34 preferably has a non-circular cross section.

Figure 11:
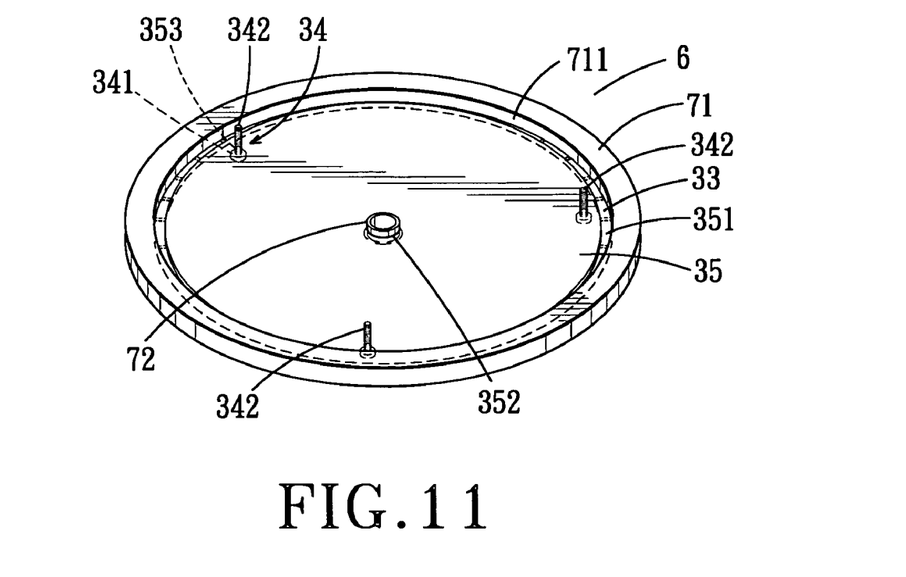
FIG. 11 is a perspective view illustrating a support plate placed over the binder layer.

In step 509, with further reference to FIG. 11, a rigid circular support plate 35 is adhered to the binder 33 before the latter is completely cured, and has a cross-section smaller than that of the layer of the binder 33. At this time, the mesh layer 32 is embedded in the binder 33 between the top layer, i.e., the first decorative members 31, and the support plate 35. The support plate 35 has an outer periphery spaced apart from the inner periphery 711 of the outer mold 71, and forms an annular space 351 with the inner periphery 711 of the outer mold 71. The support plate 35 further has a central hole 352 for extension of the inner mold 72 therethrough, and a plurality of peripheral holes 353 corresponding to the fastening members 34, respectively, for extension of the fastening portions 342 of the fastening members 34 therethrough. Each of the peripheral holes 353 has a diameter which is slightly larger than that of the fastening portion 342 of each of the fastening members 34, and which is smaller than that of the head portion 341 of each of the fastening members 34. Therefore, the head portion 341 of each of the fastening members 34 can be restricted under the support plate 35. In this embodiment, the support plate 35 is a magnesium silicate plate including magnesium oxide (MgO) as its main component. Alternatively, a gypsum plate or other synthetic plate having a definite hardness or other suitable composite plate can be used. Preferably, the plate material is light and tough.

Figure 12:
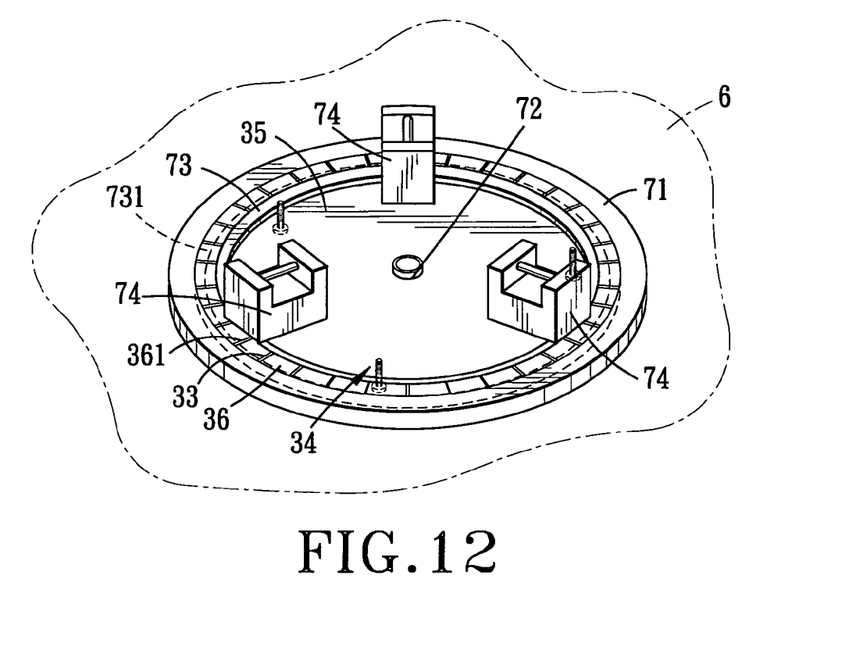
FIG. 12 is a perspective view illustrating weight members provided on the support plate.

In step 510, with further reference to FIG. 12, a ring-shaped intermediate mold 73 made of resin is mounted concentrically along the outer periphery of the support plate 35. The intermediate mold 73 has a cross-section slightly smaller than that of the support plate 35. The shape and material of the intermediate mold 73 are preferably similar to those of the outer mold 71.

Thereafter, in step 511, three spaced-apart weight members 74 are mounted circumferentially on the support plate 35 so as to press uniformly and fixedly the support plate 35, the mesh layer 32 (see FIG. 6), and the binder 34 (see FIG.

8) against the first decorative members 31. In this embodiment, the weight members 74 are metal, and weigh 20 kilos each. The weight members 74 are spaced apart from each other at an angular distance of about 120°, but are not limited as such.

Subsequently, in step 512, a plurality of spaced-apart second decorative members 36 are bonded to the layer of the binder 33 around an outer periphery of the support plate 35 but within the annular space 731 between the outer and intermediate molds 71 and 73. The second decorative members 36 form a decorative edge for the table top 3 (see FIGS. 13 and 14). The second decorative members 36 are spaced apart from each other to form gaps 361 thereamong. In this embodiment, each of the second decorative members 36 is a tile, which has a cross-section of an inverted-L shape, and has a horizontal portion 362 (see FIG. 15) extending radially and inwardly and situated below the support plate 35, and a vertical portion 363 (see FIG. 15) extending integrally and upwardly from the horizontal portion 362. It should be noted herein that the shapes and materials of the second decorative members 36 can be chosen to be similar to those of the first decorative members 31.

Thereafter, in step 513, the binder 33 is filled in the gaps 361 so that each second decorative member 36 exerts a pressing force on the outer periphery of the support plate 35 through the binder 33.

Finally, in steps 514,515, after the binder 33 in the gaps 361 in the second decorative pieces 36 has cured, the intermediate mold 73 and the weight members 74 are removed, and the table top 3 is pulled out of the outer mold 71 and the inner mold 72, and is subsequently polished and finished in a conventional manner, thereby completing the table top 3 shown in FIGS. 13 and 14.

Figure 13:
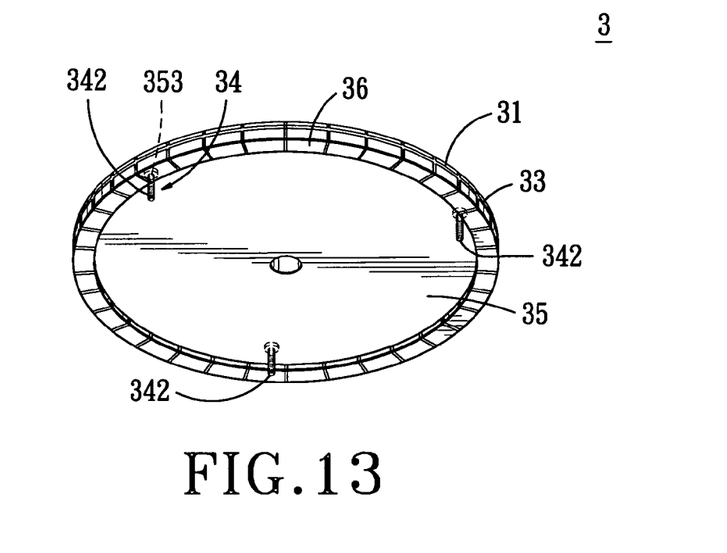
FIG. 13 is a bottom perspective view of a table top produced by the preferred embodiment.
Figure 14:
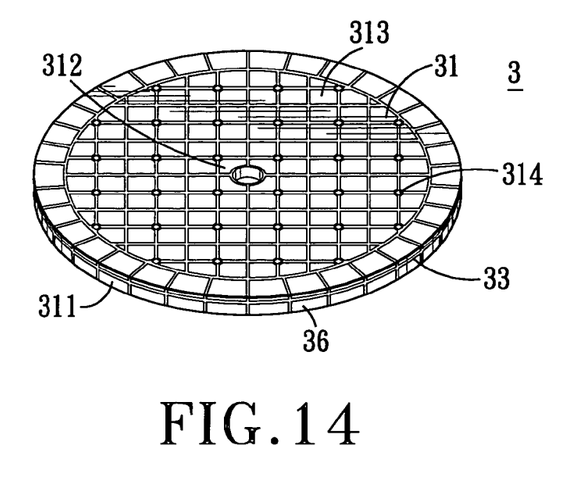
FIG. 14 is a top perspective view of the table top of FIG. 13.
Figure 15:
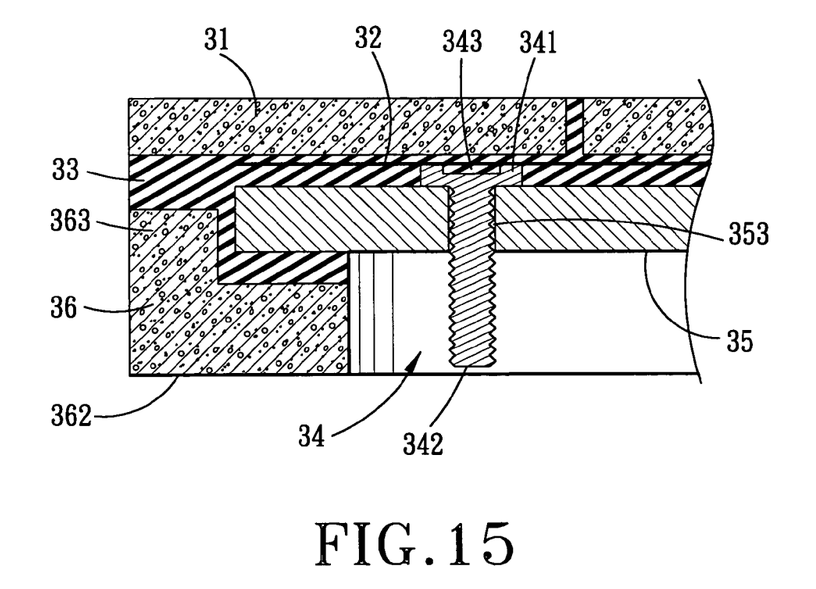
FIG. 15 is a fragmentary schematic sectional view of the table top of FIG. 13.

FIGS. 13 and 14 are perspective views as viewed from the bottom and top of the table top 3, respectively. FIG. 15 is a sectional view of the table top 3 of FIG. 13. The table top 3 includes the first decorative members 31, i.e., the tiles 311, 312, 313, 314, arranged in a pattern such that the top layer has a circumferential outer periphery. The binder 33 is cured, and extends between adjacent ones of the first decorative members 31. The mesh layer 32 (not visible in FIGS. 13 and 14) is embedded in the cured binder 33. The fastening members 34 are mounted by embedding the head portions 341 of the fastening members 34 in the cured binder 33. The table top 3 further includes the L-shaped second decorative members 36 that are formed as tiles, each of which is attached to a bottom surface of the layer of the cured binder 33. The second decorative members 36 are disposed along the outer periphery of and below the top layer. The cured binder 33 extends between adjacent ones of the second decorative members 36. The second decorative members 36 protrude downwardly from the bottom of the support plate 35, thus providing a stereo visual effect.

Figure 16:
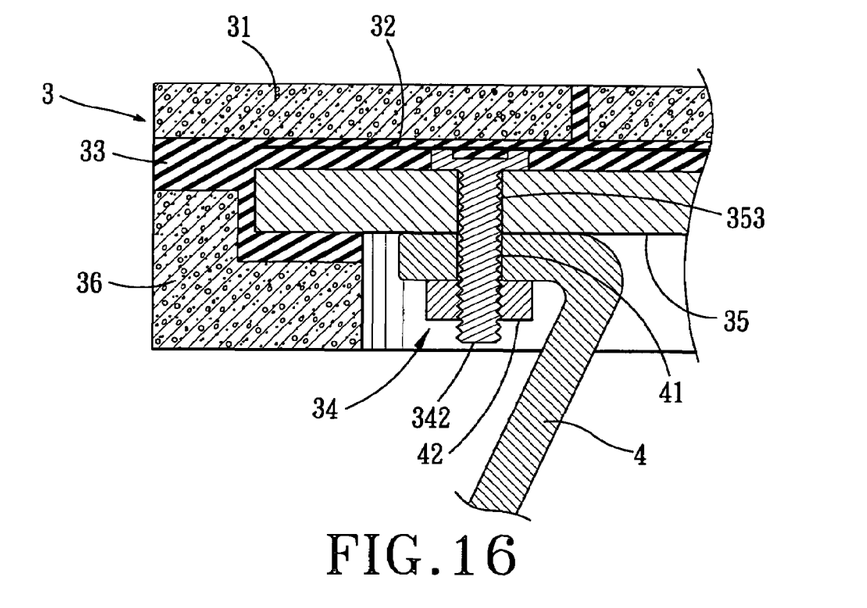
FIG. 16 is a fragmentary schematic sectional view of the table top of FIG. 13 when fastened to a table leg.

Referring to FIG. 16, when assembling the table top 3 on table legs 4, the fastening portions 342 of the fastening members 34 are extended through holes 41 in the table legs 4 respectively, and nuts 42 are used to engage the fastening portions 342 so as to retain the table legs 4 on the fastening members 34. Furthermore, the non-circular cross section of the recess 343 in the head portion 341 of each of the fastening members 34 can avoid undesired rotation of the fastening members 34 during tightening of the nuts 42.

Figure 17:
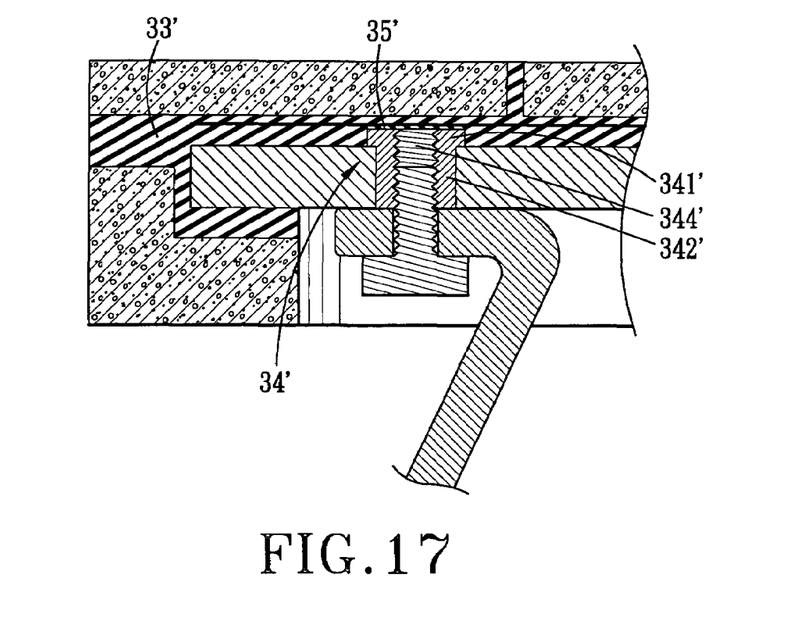
FIG. 17 is a fragmentary schematic sectional view of another preferred embodiment of the table top of this invention when fastened to a table leg.

It is understood that the configuration of the fastening member 34 can be modified by one skilled in the art without departing from the spirit and scope of this invention. For example, referring to FIG. 17, in an another preferred embodiment, the fastening member 34' is formed as a socket having an internally threaded hole 344' extending through the head portion 341' and the fastening portion 342'. A barrier film 35' is provided on the head portion 341' of the fastening member 34' so as to prevent the binder 33' from entering into the threaded hole 344'.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A process for making a table top, comprising:
   (a) mounting a ring-shaped outer mold on a flat surface;
   (b) mounting a plurality of first decorative members which are arranged in a layer on said flat surface and within said outer mold, said first decorative members being spaced apart from each other to form gaps thereamong;
   (c) filling said gaps with a curable binder, and providing a layer of said binder on said first decorative members;
   (d) mounting at least one fastening member on said binder, said fastening member including a head portion embedded in said binder, and a fastening portion extending out of said binder from said head portion, and having a cross section smaller than that of said head portion; and
   (e) adhering a rigid support plate to said binder, said rigid support plate including at least one hole corresponding to said fastening portion of said fastening member for passage of said fastening portion of said fastening member therethrough.

2. The process as claimed in claim 1, further comprising a step of mounting a mesh layer on said first decorative members before said step (c).

3. The process as claimed in claim 2, further comprising a step of mounting a hollow inner mold on said flat surface at a center of said outer mold after said step (a).

4. The process as claimed in claim 3, wherein said mesh layer has a central opening, said inner mold passing through said opening.

5. The process as claimed in claim 3, further comprising (f) mounting concentrically a ring-shaped intermediate mold on said support plate after step (e), said intermediate mold having a cross-section smaller than that of said support plate, said intermediate mold cooperating with said outer mold to form an annular space therebetween.

6. The process as claimed in claim 5, further comprising (g) mounting a plurality of spaced-apart second decorative members on said binder within said annular space after step (f).

7. The process as claimed in claim 5, further comprising a step of pressing said support plate against said binder and said first decorative members before step (g) and after step (f).

8. The process as claimed in claim 1, wherein said support plate has a cross-section smaller than that of the layer of said binder.

9. The process as claimed in claim 1, wherein said head portion of said fastening member is provided with a recess for receiving said binder.

10. The process as claimed in claim 9, wherein said recess in said head portion of said fastening member has a non-circular cross section.

11. The process as claimed in claim 1, wherein said fastening portion of said fastening member is formed as a post having an outer thread.

12. The process as claimed in claim 1, wherein said fastening member is formed as a socket having an internally threaded hole extending through said head portion and said fastening portion, said process further including, prior to step (d), providing a barrier film on said head portion of said fastening member so as to prevent said binder from entering into said threaded hole.

13. A table top comprising:
- a top layer including a plurality of first decorative members which are spaced apart from each other to form gaps thereamong;
- a cured binder filling said gaps and forming a layer that covers a bottom surface of said top layer;
- at least one fastening member including a head portion embedded in said cured binder, and a fastening portion extending out of said cured binder from said head portion, and having a cross section smaller than that of said head portion; and
- a rigid support plate adhered to said cured binder, said rigid support plate including at least one hole corresponding to said fastening portion of said fastening member for passage of said fastening portion of said fastening member therethrough.

14. The table top as claimed in claim 13, further comprising a mesh layer embedded in said cured binder between said top layer and said support plate.

15. The table top as claimed in claim 13, wherein said support plate has a cross-section smaller than that of said layer of said cured binder, said table top further including a plurality of second decorative members bonded to said layer of said cured binder around an outer periphery of said support plate.

16. The table top as claimed in claim 15, wherein said second decorative members are spaced apart from each other so that said cured binder extends between adjacent ones of said second decorative members.

17. The table top as claimed in claim 13, wherein said head portion of said fastening member is provided with a recess for receiving said cured binder.

18. The table top as claimed in claim 17, wherein said recess in said head portion of said fastening member has a non-circular cross section.

19. The table top as claimed in claim 13, wherein said fastening portion of said fastening member is formed as a post having an outer thread.

20. The table top as claimed in claim 13, wherein said fastening member is formed as a socket having an internally threaded hole extending through said head portion and said fastening portion, said table top further including a barrier film on said head portion of said fastening member so as to prevent said binder from entering into said threaded hole.

* * * * *